US012199915B2

(12) United States Patent
Li et al.

(10) Patent No.: US 12,199,915 B2
(45) Date of Patent: *Jan. 14, 2025

(54) DATA TRANSMISSION METHOD AND DEVICE

(71) Applicant: HUAWEI TECHNOLOGIES CO., LTD., Shenzhen (CN)

(72) Inventors: Zhongfeng Li, Shanghai (CN); Yongzhao Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

This patent is subject to a terminal disclaimer.

(21) Appl. No.: 18/305,205

(22) Filed: Apr. 21, 2023

(65) Prior Publication Data

US 2023/0353322 A1 Nov. 2, 2023

Related U.S. Application Data

(63) Continuation of application No. 17/385,599, filed on Jul. 26, 2021, now Pat. No. 11,637,676, which is a
(Continued)

(30) Foreign Application Priority Data

Aug. 12, 2016 (CN) .......................... 201610666714.5

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0004* (2013.01); *H04L 1/0031* (2013.01);
(Continued)

(58) Field of Classification Search
CPC ... H04L 5/0053; H04L 1/0003; H04L 1/0004; H04W 72/00; H04W 72/04;
(Continued)

(56) References Cited

U.S. PATENT DOCUMENTS 9,986,534 B2    5/2018  Chen et al.
2010/0091826 A1  4/2010  Chen et al.
(Continued)

FOREIGN PATENT DOCUMENTS

CN      102149208 A    8/2011
CN      102882663 A    1/2013
(Continued)

OTHER PUBLICATIONS

Zhilin Zhang et al., "Mitigation of Phase Noise and Phase Rotation in Single-Carrier Communication Systems Using Pilots and Smoothing Technique," 2015 IEEE International Conference on Ubiquitous Wireless Broadband (ICUWB), total 5 pages.
(Continued)

*Primary Examiner* — Peter Chen
(74) *Attorney, Agent, or Firm* — Leydig, Voit & Mayer, Ltd.

(57) ABSTRACT

Embodiments of this application provide a data transmission method and a device. The method includes: obtaining, by a terminal, first indication information or second indication information, where the first indication information is used to indicate that a reference signal is carried in a resource unit, and the second indication information is used to indicate that no reference signal is carried in a resource unit; and performing, by the terminal, data transmission according to the first indication information or the second indication information. The reference signal can be properly configured in the embodiments.

16 Claims, 6 Drawing Sheets

Related U.S. Application Data continuation of application No. 16/146,537, filed on Sep. 28, 2018, now Pat. No. 11,082,184, which is a continuation of application No. PCT/CN2017/095557, filed on Aug. 2, 2017.

(51) Int. Cl.
*H04W 72/044* (2023.01)
*H04W 72/23* (2023.01)

(52) U.S. Cl.
CPC ......... *H04L 5/0094* (2013.01); *H04W 72/044* (2013.01); *H04W 72/23* (2023.01); *H04L 1/0003* (2013.01); *H04L 1/0009* (2013.01); *H04L 1/0025* (2013.01)

(58) Field of Classification Search
CPC ............. H04W 72/042; H04W 72/044; H04W 72/0406; H04W 72/0413; H04W 72/1289; H04W 88/02; H04W 88/08
See application file for complete search history.

(56) References Cited

U.S. PATENT DOCUMENTS

| | | |
|---|---|---|
| 2011/0235743 A1 | 9/2011 | Lee et al. |
| 2012/0218882 A1 | 8/2012 | Ko et al. |
| 2012/0230272 A1 | 9/2012 | Kim et al. |
| 2014/0205030 A1 | 7/2014 | Lee et al. |
| 2014/0247778 A1 | 9/2014 | Gomadam |
| 2014/0293881 A1 | 10/2014 | Khoshnevis et al. |
| 2014/0314012 A1 | 10/2014 | Tang |
| 2015/0029989 A1 | 1/2015 | Shiizaki et al. |
| 2015/0055583 A1 | 2/2015 | Lunttila et al. |
| 2015/0162966 A1 | 6/2015 | Kim et al. |
| 2015/0282140 A1 | 10/2015 | Ezaki |
| 2016/0029161 A1 | 1/2016 | Park et al. |
| 2016/0087774 A1 | 3/2016 | Guo et al. |
| 2016/0088594 A1 | 3/2016 | Xiong et al. |
| 2016/0157215 A1 | 6/2016 | Shiizaki et al. |
| 2016/0337874 A1 | 11/2016 | Yang et al. |
| 2017/0048086 A1 | 2/2017 | Subramanian et al. |
| 2017/0155479 A1 | 6/2017 | Sun et al. |
| 2017/0294926 A1 | 10/2017 | Islam et al. |
| 2018/0048498 A1 | 2/2018 | Stern-Berkowitz et al. |
| 2018/0146456 A1 | 5/2018 | Zhou et al. |
| 2018/0376496 A1 | 12/2018 | Wang et al. |

FOREIGN PATENT DOCUMENTS

| | | |
|---|---|---|
| CN | 103167615 A | 6/2013 |
| CN | 103477579 A | 12/2013 |
| CN | 104125186 A | 10/2014 |
| CN | 104170489 A | 11/2014 |
| CN | 104428998 A | 3/2015 |
| CN | 104735691 A | 6/2015 |
| CN | 105144817 A | 12/2015 |
| CN | 104160766 B | 4/2019 |
| JP | 2015192421 A | 11/2015 |
| JP | 2016518035 A | 6/2016 |
| WO | 2013008948 A1 | 1/2013 |
| WO | 2013140436 A1 | 9/2013 |
| WO | 2016000915 A1 | 1/2016 |

OTHER PUBLICATIONS

R1-1611240 Huawei, HiSilicon, "Reference signal design for phase tracking," 3GPP TSG RAN WG1 Meeting #87, Reno, USA, Nov. 14-18, 2016, total 5 pages.

Ericsson, Definition of DCI bit fields for short TTI [online], 3GPP TSG-RAN WG1#84b R1-163323, Apr. 15, 2016, Section 2.2, total 5 pages.

HTC, "Discussion on Reference Signals for Enhanced PDCCH," 3GPP TSG-RAN WG1 #68, Dresden, Germany, R1-120265, Total 3 pages, 3rd Generation Partnership Project, Valbonne, France (Feb. 6-10, 2012).

DATA TRANSMISSION METHOD AND DEVICE

CROSS-REFERENCE TO RELATED APPLICATIONS

This application is a continuation of U.S. patent application Ser. No. 17/385,599, filed on Jul. 26, 2021, which is a continuation of U.S. patent application Ser. No. 16/146,537, filed on Sep. 28, 2018, now U.S. Pat. No. 11,082,184, which is a continuation of International Application No. PCT/CN2017/095557, filed on Aug. 2, 2017, The International Application claims priority to Chinese Patent Application No. 201610666714.5, filed on Aug. 12, 2016. All of the afore-mentioned patent applications are hereby incorporated by reference in their entireties.

TECHNICAL FIELD

Embodiments of this application relate to the field of communications technologies, and in particular, to a data transmission method and a device.

BACKGROUND

During data transmission in a wireless communications system, data received by a receiving end is usually different from data sent by a transmitting end due to a very complex propagation environment between the transmitting end and the receiving end.

In order that the receiving end can restore the data sent by the transmitting end, the transmitting end inserts a reference signal at a fixed location of a resource unit during data transmission. Therefore, the receiving end can restore, based on the inserted reference signal, the data sent by the transmitting end.

In practice, in some cases, for example when the propagation environment is relatively ideal, a reference signal may be inserted into a small quantity of resource units to enable the receiving end to restore the data sent by the transmitting end. However, the reference signal cannot be flexibly configured in the manner of inserting a reference signal at a fixed location of a resource unit, thereby causing excessive overheads.

SUMMARY

Embodiments of this application provide a data transmission method and a device, to resolve a problem that a reference signal cannot be flexibly configured.

According to one aspect, an embodiment of this application provides a data transmission method, including obtaining, by a terminal, first indication information or second indication information, where the first indication information is used to indicate that a reference signal is carried in a resource unit, and the second indication information is used to indicate that no reference signal is carried in a resource unit, for example, the terminal receives the first indication information or the second indication information from a base station; and performing, by the terminal, data transmission according to the first indication information or the second indication information. Optionally, the reference signal is used for at least phase noise cancellation. The terminal may perform uplink data transmission or downlink data transmission with the base station according to the first indication information or the second indication information. Optionally, when the terminal performs downlink data transmission according to the first indication information, the terminal performs phase noise cancellation based on the reference signal. In a solution of this embodiment of this application, the first indication information is used to indicate that a reference signal is carried in a resource unit, and the second indication information is used to indicate that no reference signal is carried in a resource unit. Therefore, the reference signal is properly configured, and this avoids a problem that overheads of the reference signal are excessively large or reference signals are significantly insufficient, so that a process in which the terminal and the base station perform data transmission according to the first indication information or the second indication information is reliable.

In a possible design, that the terminal receives the first indication information or the second indication information from a base station includes one of the following cases the terminal receives system information from the base station, where the system information includes the first indication information or the second indication information; the terminal receives a radio resource control (RRC) message from the base station, where the RRC message includes the first indication information or the second indication information; or the terminal receives downlink control information (DCI) from the base station, where the DCI includes the first indication information or the second indication information, and the system information may be a system information block or a master information block.

Optionally, the first indication information or the second indication information is carried in a first indication field.

Optionally, when the first indication information is carried in the first indication field, the system information, the RRC message, or the DCI further includes at least one of the following indication fields: a second indication field, used to indicate an identifier of a reference signal sequence; a third indication field, used to indicate a time-frequency resource location of the reference signal; or a fourth indication field, used to indicate a port identifier of the reference signal.

Optionally, there is a correspondence between the port identifier of the reference signal and the identifier of the reference signal sequence. In this case, when the port identifier of the reference signal is obtained, the identifier of the reference signal sequence may be obtained based on the correspondence, or when the identifier of the reference signal sequence is obtained, the port identifier of the reference signal may be obtained based on the correspondence.

By receiving the system information, the RRC message, or the downlink control information sent by the base station, the indication information or configuration information is sent by using an existing message. A communication method does not need to be changed. Therefore, this embodiment is compatible with the prior art, and is easy to operate and implement.

In a possible design, the obtaining, by a terminal, first indication information or second indication information includes: receiving, by the terminal, DCI from a base station, where the DCI includes information about a modulation order and/or information about a quantity of scheduled resource blocks; and obtaining, by the terminal, the first indication information or the second indication information based on the information about the modulation order and/or the information about the quantity of scheduled resource blocks. Specifically, when the modulation order is greater than or equal to a preset modulation order and/or the quantity of scheduled resource blocks is greater than or equal to a preset quantity, the terminal may obtain the first indication information; or when the modulation order is less than a preset modulation order and/or the quantity of scheduled resource blocks is less than a preset quantity, the terminal may obtain the second indication information. Because higher-order modulation is very sensitive to phase noise, and lower-order modulation is insensitive to phase noise, the reference signal for phase noise is not required when the modulation order is less than the preset modulation order. When the quantity of scheduled Resource Blocks (RBs) is greater than or equal to the preset quantity, a gain brought by a phase noise pilot may be greater than a loss caused by overheads of the phase noise pilot. Therefore, when the quantity of scheduled RBs is greater than or equal to the preset quantity, the phase noise pilot may be inserted for phase noise estimation.

In a possible design, the terminal may implicitly obtain the configuration information based on existing information. The following possible cases are specifically included:

In a possible case, the terminal obtains the configuration information of the reference signal based on a correspondence between a cyclic redundancy check (CRC) mask of a physical broadcast channel (PBCH) and configuration information.

In another possible case, the terminal obtains the configuration information of the reference signal based on a correspondence between a physical cell identifier and configuration information.

In a possible design, the terminal sends capability information of the terminal to the base station, and the capability information is used to indicate whether the terminal has a capability of canceling phase noise. The base station receives the capability information, and generates the first indication information or the second indication information based on the capability information. The terminal sends the capability information to the base station. The base station generates the first indication information or the second indication information based on the capability information. Therefore, not only overheads of the phase noise pilot are reduced, but also it is ensured that downlink data finally obtained by the terminal is not interfered by the phase noise.

In a possible design, the terminal sends a configuration request message of a downlink reference signal to the base station. The configuration request message is used to request the base station to stop sending the downlink reference signal, or is used to request the base station to send the downlink reference signal. The base station receives the configuration request message, and the base station generates the first indication information or the second indication information based on the configuration request message. The terminal sends the configuration request message to the base station. The base station generates the indication information based on the configuration request message. Therefore, not only overheads of the phase noise pilot are reduced, but also it is ensured that downlink data finally obtained by the terminal is not interfered by the phase noise.

In a possible design, reference signals may be further classified into a user-level reference signal and a cell-level reference signal, to be specific, a user-level phase noise pilot and a cell-level phase noise pilot. Optionally, for downlink data transmission, when a quantity of terminals in a preset range is less than a first preset quantity, a user-level phase noise pilot is used; or when a quantity of terminals in a preset range is greater than a second preset quantity, a cell-level phase noise pilot is used. The first preset quantity may be equal to the second preset quantity, or the first preset quantity may be less than the second preset quantity. The preset range may be a range covered by a physical cell.

According to another aspect, this application provides another data transmission method, including: sending, by a base station, first indication information or second indication information to a terminal, where the first indication information is used to indicate that a reference signal is carried in a resource unit, and the second indication information is used to indicate that no reference signal is carried in a resource unit; and performing, by the base station, data transmission according to the first indication information or the second indication information. Optionally, the reference signal is used for at least phase noise cancellation. The base station may perform uplink data transmission or downlink data transmission with the terminal according to the first indication information or the second indication information. Optionally, when the base station performs uplink data transmission according to the first indication information, the base station performs phase noise cancellation based on the reference signal. In a solution of this embodiment, the first indication information is used to indicate that a reference signal is carried in a resource unit, and the second indication information is used to indicate that no reference signal is carried in a resource unit. Therefore, the reference signal is properly configured, and this avoids a problem that overheads of the reference signal are excessively large or reference signals are significantly insufficient, so that a process in which the terminal and the base station perform data transmission according to the first indication information or the second indication information is reliable.

In a possible design, the sending, by a base station, first indication information or second indication information to a terminal includes one of the following cases: sending, by the base station, system information to the terminal, where the system information includes the first indication information or the second indication information; sending, by the base station, a radio resource control (RRC) message to the terminal, where the RRC message includes the first indication information or the second indication information; or sending, by the base station, downlink control information (DCI) to the terminal, where the DCI includes the first indication information or the second indication information. For an indication field included in the system information, the RRC message, and the DCI, refer to the foregoing description, and details are not described herein again.

According to still another aspect, an embodiment of this application provides a terminal, and the terminal can implement functions executed by the terminal in the foregoing method embodiment. The functions may be implemented by using hardware, or may be implemented by hardware by executing corresponding software. The hardware or the software includes one or more modules corresponding to the foregoing functions.

In a possible design, a structure of the terminal includes a processor, and a transmitter/receiver. The processor is configured to support the terminal in performing corresponding functions in the foregoing method. The transmitter/receiver is configured to support communication between the terminal and a base station. The terminal may further include a memory. The memory is configured to be coupled to the processor. The memory stores a program instruction and data of the terminal.

According to still another aspect, an embodiment of this application provides a base station, and the base station can implement functions executed by the base station in the foregoing method embodiment. The functions may be implemented by using hardware, or may be implemented by hardware by executing corresponding software. The hardware or the software includes one or more modules corresponding to the foregoing functions.

In a possible design, a structure of the base station includes a processor, and a transmitter/receiver. The processor is configured to support the base station in performing corresponding functions in the foregoing method. The transmitter/receiver is configured to support communication between the base station and a terminal. The base station may further include a memory. The memory is configured to be coupled to the processor. The memory stores a program instruction and data of the base station.

According to still another aspect, an embodiment of this application provides a communications system. The system includes the base station and the terminal described in the foregoing aspects.

According to yet another aspect, an embodiment of this application provides a computer storage medium, configured to store a computer software instruction used by the terminal. The computer software instruction includes a related program used for executing the foregoing aspect.

According to yet another aspect, an embodiment of this application provides a computer storage medium, configured to store a computer software instruction used by the base station. The computer software instruction includes a related program used for executing the foregoing aspect.

In comparison with the prior art, in the solution provided in the embodiments of this application, the first indication information is used to indicate that a reference signal is carried in a resource unit, and the second indication information is used to indicate that no reference signal is carried in a resource unit. Therefore, the reference signal is properly configured, and this avoids a problem that overheads of the reference signal are excessively large or reference signals are significantly insufficient, so that a process in which the terminal and the base station perform data transmission according to the first indication information or the second indication information is reliable.

DESCRIPTION OF EMBODIMENTS

The following describes the technical solutions in the embodiments of this application with reference to the accompanying drawings in the embodiments of this application.

A network architecture and a service scenario described in the embodiments of this application are intended to more clearly describe the technical solutions in the embodiments of this application, and do not constitute a limitation on the technical solutions provided in the embodiments of this application. Persons of ordinary skill in the art may learn that, with evolution of the network architecture and emergence of a new service scenario, the technical solutions provided in the embodiments of this application are applicable to similar technical problems.

Figure 1:
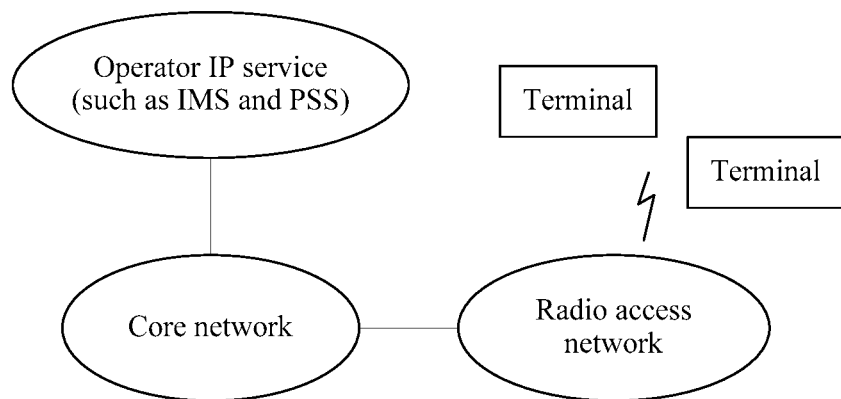
FIG. 1 shows a possible applicable application scenario according to an embodiment of this application.
Figure 2:
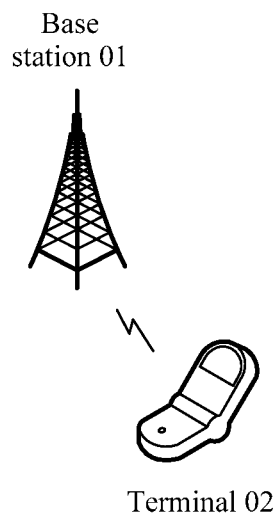
FIG. 2 shows a possible applicable network architecture according to an embodiment of this application.

The following first describes a possible application scenario and network architecture in the embodiments of this application with reference to FIG. 1 and FIG. 2.

FIG. 1 shows a possible applicable application scenario according to an embodiment of this application. As shown in FIG. 1, a terminal accesses an operator Internet Protocol (IP) service network such as a IP multimedia subsystem (IMS) network or a packet switched streaming service (PSS) network by using a radio access network (RAN) and a core network (CN). The technical solutions described in this application may be applied to a Long Term Evolution (LTE) system, or other wireless communications systems of various radio access technologies, for example, a system using an access technology such as Code Division Multiple Access (CDMA), Frequency Division Multiple Access (FDMA), Time Division Multiple Access (TDMA), orthogonal frequency division multiple access OFDMA), or a single carrier frequency division multiple access (SC-FDMA). In addition, the technical solutions may further be applied to a subsequent evolved system of the LTE system, for example, a 5th Generation (5G) system. For clarity, only the LTE system is used as an example herein for description. In the LTE system, an evolved universal terrestrial radio access network (E-UTRAN) is used as a radio access network, and an evolved packet core (EPC) is used as a core network. The terminal accesses an IMS network by using the E-UTRAN and the EPC. It should be noted that a name of the base station and a name of the terminal may change when the solutions in the embodiments of this application are applied to the 5G system or another system that may occur in the future, but this does not affect implementation of the solutions in the embodiments of this application.

In the embodiments of this application, a noun "network" and a noun "system" are usually used alternately, but persons skilled in the art may understand a meaning. A terminal related to the embodiments of this application may include a handheld device, an in-vehicle device, a wearable device, or a computing device that has a wireless communication function; another processing device connected to a wireless modem; or user equipment (UE) in various forms including a mobile station (MS), a terminal device, and the like. For ease of description, the devices mentioned above are collectively referred to as a terminal. A base station (BS) related to the embodiments of this application is an apparatus that is deployed in a radio access network and that is configured to provide a wireless communication function for a terminal. The base station may include a macro base station, a micro base station, a relay node, an access point, and the like in various forms. In systems using different radio access technologies, names of devices having a function of a base station may vary. For example, the device is referred to as an evolved NodeB (eNB or eNodeB) in a Long Term Evolution (LTE) system, or referred to as a NodeB in a 3G communications system. For ease of description, in the embodiments of this application, all the foregoing apparatuses that provide a wireless communications function for the terminal are referred to as a base station or a BS.

In the application scenario shown in FIG. 1, FIG. 2 shows a possible applicable network architecture according to an embodiment of this application. The network architecture mainly includes a base station 01 and a terminal 02. Wireless communication is performed between the base station 01 and the terminal 02.

The following further describes the embodiments of this application in detail based on common aspects mentioned in the foregoing embodiments of this application.

In an existing solution, when data transmission is performed between a base station and a terminal, a reference signal is fixedly inserted into a resource unit. In this way, a receiving end of data performs channel estimation, channel detection, phase noise estimation, and the like based on the reference signal, to restore the data sent by a transmitting end. The resource unit refers to a time-frequency resource unit used to carry data, for example, one or more resource blocks (RB) or one or more resource block groups (RBG). For example, during downlink data transmission, the base station inserts a downlink reference signal into the resource unit, and when receiving a downlink signal that includes the downlink reference signal, the terminal may perform channel estimation, channel detection, phase noise estimation, and the like based on the downlink reference signal, to restore downlink data. Similarly, in uplink data transmission, the base station may also restore uplink data based on an uplink reference signal.

However, in the existing solution of inserting a reference signal at a fixed location of a resource unit, the reference signal cannot be flexibly configured. As a result, in practice, overheads of the reference signal may be excessively large, or inserted reference signals are significantly insufficient, and consequently a requirement of an actual propagation environment cannot be met.

In view of this, an embodiment provides a data transmission method, to properly configure a reference signal. It should be noted that, in this embodiment of this application, the related reference signal may be used for at least one of channel estimation, channel detection, frequency offset estimation, phase noise estimation, or phase noise cancellation. Alternatively, the reference signal may be a reference signal specially used for channel estimation, a reference signal specially used for channel detection, a reference signal specially used for phase noise estimation, or a reference signal specially used for phase noise cancellation. The reference signal specially used for phase noise cancellation or a reference signal at least used for phase noise cancellation may also be referred to as a phase noise pilot. For ease of description, in methods shown in FIG. 3 to FIG. 8, the embodiments of this application are described by using a phase noise pilot as an example.

Specifically, for the phase noise pilot, in a wireless communications system, because a frequency processing component of a transmitting end is not ideal, an output carrier signal is not pure, and may carry phase noise. In a future evolved wireless system of the 3rd Generation Partnership Project (3GPP), a used spectrum includes high frequency. Therefore, to resolve phase noise generated due to high frequency, a receiving end uses the phase noise pilot to estimate the phase noise, and then compensates for impact of the phase noise to eliminate the phase noise.

Figure 3:
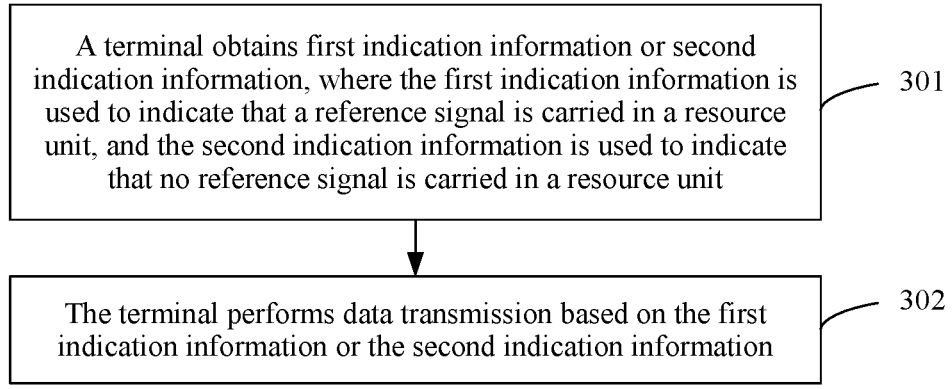
FIG. 3 is a schematic flowchart of Embodiment 1 of a data transmission method according to an embodiment of this application.

FIG. 3 is a schematic flowchart of Embodiment 1 of a data transmission method according to an embodiment of this application. As shown in FIG. 3, the method includes:

S301. A terminal obtains first indication information or second indication information, where the first indication information is used to indicate that a reference signal is carried in a resource unit, and the second indication information is used to indicate that no reference signal is carried in a resource unit.

S302. The terminal performs data transmission according to the first indication information or the second indication information.

The terminal in this embodiment obtains different indication information indicating whether a reference signal is carried in a resource unit. The indication information may be information predefined in a system, or may be indication information received by the terminal from a base station, or may be indication information received by the terminal from another network element. The reference signal may be an uplink reference signal or a downlink reference signal.

In an example, the first indication information or the second indication information may be carried in an information element. When the information element carries the first indication information, it indicates that a reference signal is carried in a resource unit. When the information element carries the second indication information, it indicates that no reference signal is carried in a resource unit. That is, in this case, the information element may be used to indicate whether a reference signal is carried in a resource unit.

Optionally, in this embodiment, when at least one of the following conditions is met, a reference signal needs to be carried in a resource unit. The at least one of the following conditions is specifically: The terminal or the base station has a capability of canceling phase noise; a modulation order of a modulation and coding scheme (MCS) used in the system is greater than or equal to a preset modulation order; or a quantity of scheduled resource blocks is greater than or equal to a preset quantity.

Correspondingly, when at least one of following conditions is met, no reference signal is carried in a resource unit. The at least one of the following conditions is specifically: The terminal or the base station does not have a capability of canceling phase noise; a modulation order of an MCS used in the system is less than a preset modulation order; or a quantity of scheduled resource blocks is less than a preset quantity. In this case, when the reference signal is not required during phase noise estimation, the reference signal is not inserted into the resource unit, thereby reducing overheads of the reference signal.

Persons skilled in the art may understand that higher-order modulation is very sensitive to phase noise, and lower-order modulation is insensitive to phase noise. When the quantity of scheduled RBs is greater than or equal to the preset quantity, a gain brought by a phase noise pilot may be greater than a loss caused by overheads of the phase noise pilot; or when the quantity of scheduled RBs is less than the preset quantity, a gain brought by a phase noise pilot may be less than a loss caused by overheads of the phase noise pilot.

In an example, when the terminal obtains the first indication information, the terminal may obtain configuration information. The configuration information includes the first indication information. The configuration information further includes time-frequency resource location information of the reference signal, port information of the reference signal, or sequence information of the reference signal.

Specifically, the terminal may obtain the configuration information in a predefined manner, may receive the configuration information from the base station, or may obtain the configuration information from other information sent by the base station. A specific implementation in which the terminal obtains the configuration information is not limited herein in this embodiment.

The time-frequency resource location information of the reference signal includes a time-frequency resource location of the reference signal, or may include a location type of a time-frequency resource of the reference signal, to be specific, each location type corresponds to a time-frequency resource location. The time-frequency resource location may be a location of the reference signal in time domain and/or frequency domain. In an optional embodiment, the reference signal occupies one or more subcarriers. Correspondingly, the time-frequency resource location of the reference signal may be a location of a scheduled subcarrier of the reference signal in frequency domain.

The sequence information of the reference signal includes a reference signal sequence; or may include an identifier of a reference signal sequence, where there is a correspondence between the identifier of the reference signal sequence and the reference signal sequence.

The port information of the reference signal includes an identifier of a port of the reference signal. The port of the reference signal is specifically an antenna port, and the identifier may be specifically a port number. The antenna port is configured to distinguish between resources in space, and different reference signals may be transmitted on different antenna ports.

Specifically, when a reference signal is carried in a resource unit, the terminal obtains the first indication information. The first indication information is used to indicate that a reference signal is carried in a resource unit. Data transmission may be performed between the base station and the terminal according to the first indication information. The data transmission includes uplink data transmission and downlink data transmission.

In an example, when the reference signal is a downlink reference signal, the terminal and the base station perform downlink data transmission according to the first indication information. Correspondingly, the terminal may perform phase noise cancellation based on the downlink reference signal, and a specific process may be shown in FIG. 4. When the reference signal is an uplink reference signal, the base station and the terminal perform uplink data transmission according to the first indication information. Correspondingly, the base station may perform phase noise cancellation based on the uplink reference signal, and a specific process may be shown in FIG. 5.

Figure 4:
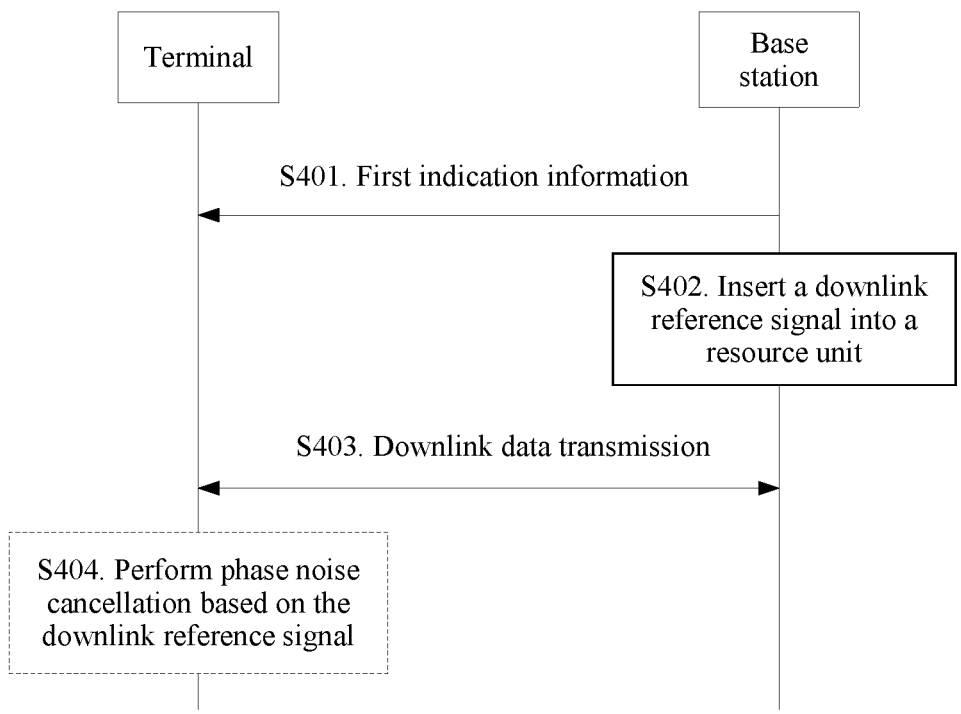
FIG. 4 is a signaling flowchart 1 of Embodiment 1 of a data transmission method according to an embodiment of this application.
Figure 5:
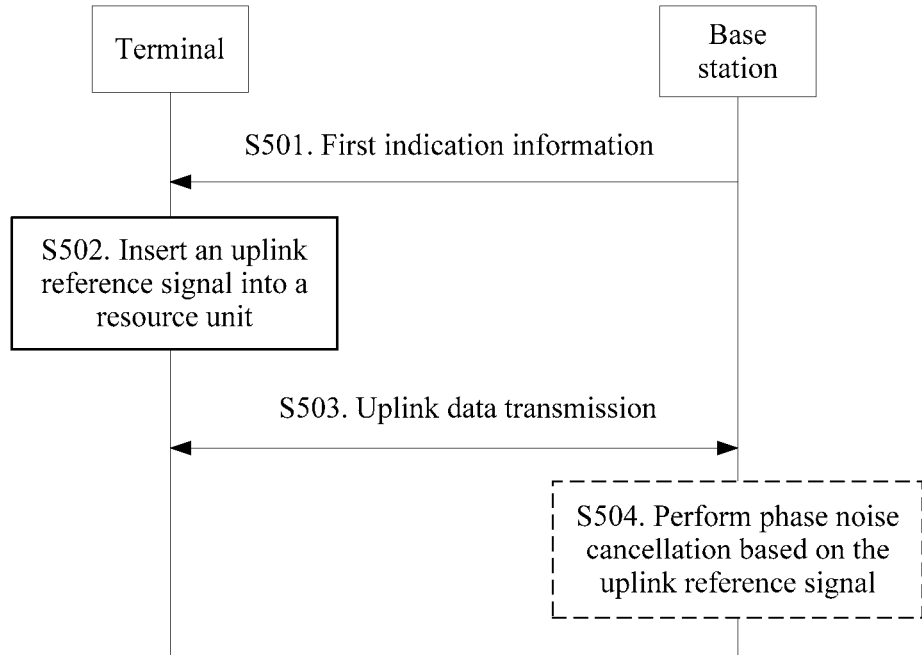
FIG. 5 is a signaling flowchart 2 of Embodiment 1 of a data transmission method according to an embodiment of this application.

In methods shown in FIG. 4 and FIG. 5, an example in which the terminal receives the first indication information from the base station is used for description.

FIG. 4 is a signaling flowchart 1 of Embodiment 1 of a data transmission method according to an embodiment of this application. FIG. 4 mainly describes a downlink data transmission process between a base station and a terminal. As shown in FIG. 4, the method includes:

S401. The base station sends first indication information to the terminal.

The first indication information is used to indicate that a downlink reference signal is carried in a resource unit.

S402. The base station inserts a downlink reference signal into a resource unit.

S403. The base station and the terminal perform downlink data transmission.

S404. The terminal performs phase noise cancellation based on the downlink reference signal.

S402 to S404 are a process in which the base station and the terminal perform downlink data transmission according to the first indication information. It should be noted that S404 is an optional step.

FIG. 5 is a signaling flowchart 2 of Embodiment 1 of a data transmission method according to an embodiment of this application. FIG. 5 mainly describes an uplink data transmission process of a base station and a terminal. As shown in FIG. 5, the method includes:

S501. The base station sends first indication information to the terminal.

The first indication information is used to indicate that an uplink reference signal is carried in a resource unit.

S502. The terminal inserts an uplink reference signal into a resource unit.

S503. The base station and the terminal perform uplink data transmission.

S504. The base station performs phase noise cancellation based on the uplink reference signal.

S502 to S504 are a process in which the base station and the terminal perform uplink data transmission according to the first indication information. It should be noted that S504 is an optional step.

When no reference signal is carried in a resource unit, the terminal obtains second indication information. The second indication information is used to indicate that no reference signal is carried in a resource unit. The base station and the terminal may perform data transmission based on the second indication information. The data transmission includes uplink data transmission and downlink data transmission. In this case, in a downlink data transmission process, the base station does not insert a phase noise pilot into the resource unit; and after receiving a downlink signal, the terminal does not perform a phase noise cancellation operation. In an uplink data transmission process, the terminal does not insert a phase noise pilot into the resource unit; and after receiving an uplink signal, the base station does not perform a phase noise cancellation operation. In this case, the phase noise pilot does not need to be inserted into the resource unit, so as to reduce transmission overheads. In addition, the base station or the terminal may not need to perform a phase noise cancellation operation, so as to simplify an operation of the base station or the terminal.

According to the data transmission method provided in this embodiment, the terminal obtains the first indication information or the second indication information. The first indication information is used to indicate that a reference signal is carried in a resource unit, and the second indication information is used to indicate that no reference signal is carried in a resource unit. Therefore, the reference signal is properly configured, and this avoids a problem that overheads of the reference signal are excessively large or reference signals are significantly insufficient, so that a process in which the terminal and the base station perform data transmission according to the first indication information or the second indication information is reliable.

For the first indication information, the second indication information, or the configuration information in the foregoing embodiments, the following uses an example to describe a specific implementation in which the terminal obtains the first indication information, the second indication information, or the configuration information. Persons skilled in the art may understand that the first indication information, the second indication information, or the configuration information in the following may be first indication information, second indication information, or configuration information for downlink data transmission; or may be first indication information, second indication information, or configuration information for uplink data transmission. Refer to FIG. 5 for application of the first indication information, the second indication information, or the configuration information in the uplink data transmission process. Refer to FIG. 4 for application of the first indication information, the second indication information, or the configuration information in the downlink data transmission process. Details are not described herein again in this embodiment.

In a specific embodiment, the base station may include the first indication information or the second indication information in another message sent to the terminal. The following feasible implementations may be specifically included:

In a feasible implementation, the base station sends system information to the terminal, and the terminal receives the system information from the base station, where the system information includes the first indication information or the second indication information. It should be noted that the system information may be specifically a system information block (SIB), or may be a master information block (MIB).

In another feasible implementation, the base station sends a radio resource control (RRC) message to the terminal, and the terminal receives the RRC message from the base station, where the RRC message includes the first indication information or the second indication information.

In still another feasible implementation, the base station sends downlink control information (DCI) to the terminal, and the terminal receives the DCI from the base station, where the DCI includes the first indication information or the second indication information.

Based on the foregoing feasible implementations, a first indication field is set in the system information, the RRC message, or the DCI. The first indication information or the second indication information is carried in the first indication field. Specifically, the first indication field may be 1 bit. For example, 1 indicates that a phase noise pilot is inserted into a resource unit, and 0 indicates that no phase noise pilot is inserted into a resource unit; or 1 indicates that no phase noise pilot is inserted into a resource unit, and 0 indicates that a phase noise pilot is inserted into a resource unit.

Optionally, when the first indication information is carried in the first indication field, the system information, the RRC message, or the DCI further includes at least one of the following indication fields:

a second indication field, used to indicate an identifier of a reference signal sequence, where the identifier of the reference signal sequence may be, for example, an index of the reference signal sequence;

a third indication field, used to indicate a time-frequency resource location of a reference signal, where the time-frequency resource location of the reference signal may be indicated by using type information of the reference signal, for example, different types of reference signals correspond to different locations; or a fourth indication field, used to indicate a port identifier of the reference signal, where the port identifier of the reference signal may be, for example, an index of a port of the reference signal.

The indication fields are separately described in the following by using examples.

The second indication field is used to indicate the identifier of the reference signal sequence. Specifically, the identifier of the reference signal sequence may be, for example, 1, 2, or 3. If there are N (N is a natural number) reference signal sequences, $\log_2 N$ bits are used to indicate an identifier of a reference signal sequence.

The third indication field is used to indicate the time-frequency resource location of the reference signal. Specifically, it may be predefined that there are N (N is a natural number) types of time-frequency resource locations of reference signals. Each location type corresponds to a specific time-frequency resource location, and $\log_2 N$ bits are used to indicate a location type of a time-frequency resource.

The fourth indication field is used to indicate the port identifier of the reference signal. Further, there is a correspondence between the port identifier of the reference signal and the identifier of the reference signal sequence. In this case, when the port identifier of the reference signal is obtained, the identifier of the reference signal sequence may be obtained based on the correspondence, or when the identifier of the reference signal sequence is obtained, the port identifier of the reference signal may be obtained based on the correspondence. Table 1 shows a feasible correspondence.

TABLE 1

| Identifier of a reference signal sequence | Reference signal sequence | Port identifier of a reference signal |
|---|---|---|
| 1 | 1, 1, 1, 1, 1, 1, 1, 1 | 7 |
| 2 | 1, 1, −1, −1, 1, 1, −1, −1 | 8 |
| 3 | 1, −1, 1, −1, 1, −1, 1, −1 | 9 |
| 4 | 1, −1, −1, 1, 1, −1, −1, 1 | 10 |

In this embodiment, the base station sends the system information, the RRC message, or the downlink control information to the terminal. The indication information or the configuration information is sent by using an existing message, and a communication method does not need to be changed. Therefore, this embodiment is compatible with the prior art, and is easy to operate and implement.

In another specific embodiment, based on the embodiment of FIG. 3, the terminal may further obtain the first indication information or the second indication information based on information included in the downlink control information. The following provides detailed description with reference to FIG. 6.

Figure 6:
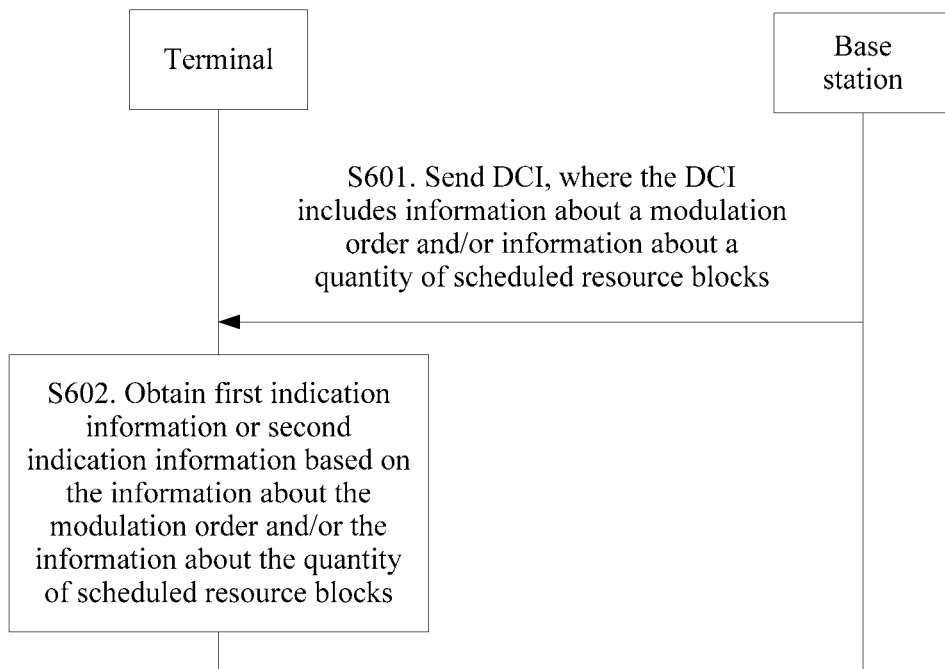
FIG. 6 is a signaling flowchart of Embodiment 2 of a data transmission method according to an embodiment of this application.

FIG. 6 is a signaling flowchart of Embodiment 2 of a data transmission method according to an embodiment of this application. As shown in FIG. 6, the method includes: S601. A base station sends DCI to a terminal.

The DCI includes information about a modulation order and/or information about a quantity of scheduled resource blocks.

S602. The terminal obtains first indication information or second indication information based on information about a modulation order and/or information about a quantity of scheduled resource blocks.

The DCI information includes at least the following content elements: resource block allocation information, and a modulation and coding scheme (MCS). The resource block allocation information includes the quantity of scheduled resource blocks. The MCS includes the modulation order. The modulation order includes 2, 4, and 6. There is a correspondence between a modulation mode and a modulation order. For example, quadriphase shift keying (QPSK) corresponds to a modulation order 2, 16 quadrature amplitude modulation (QAM) corresponds to a modulation order 4, and 64QAM corresponds to a modulation order 6.

Specifically, the terminal may obtain the first indication information by using the following feasible implementations:

In a feasible implementation, when the modulation order is greater than or equal to a preset modulation order, the terminal obtains the first indication information.

In another feasible implementation, when the quantity of scheduled resource blocks is greater than or equal to a preset quantity, the terminal obtains the first indication information.

In still another feasible implementation, when the modulation order is greater than or equal to a preset modulation order, and the quantity of scheduled resource blocks is greater than or equal to a preset quantity, the terminal obtains the first indication information.

Correspondingly, the terminal may obtain the second indication information by using the following feasible implementations:

In a feasible implementation, when the modulation order is less than a preset modulation order, the terminal obtains the second indication information.

In another feasible implementation, when the quantity of scheduled resource blocks is less than a preset quantity, the terminal obtains the second indication information.

In still another feasible implementation, when the modulation order is less than a preset modulation order, and the quantity of scheduled resource blocks is less than a preset quantity, the terminal obtains the second indication information.

Optionally, the preset modulation order for the modulation order and the preset quantity for the quantity of scheduled RBs may be a default order or quantity in the system or may be predefined in the system, or may be sent by the base station to the terminal in advance by using various messages or signaling.

Persons skilled in the art may understand that when the terminal obtains the indication information based on the downlink control information, and when the base station sends system information, an RRC message, or the downlink control information to the terminal, a first indication field does not need to be set in an indication field of each piece of information.

In this embodiment, the terminal implicitly obtains the first indication information or the second indication information by using the downlink control information. There is no need to independently send information, existing information is unchanged, and no new information is added. Therefore, a process in which the terminal obtains the indication information is simple and easy to implement.

In a still another specific embodiment, the terminal may implicitly obtain configuration information based on existing information. The following possible cases are specifically included:

In a possible case, the terminal obtains the configuration information of the reference signal based on a correspondence between a cyclic redundancy check (CRC) mask of a physical broadcast channel (PBCH) and configuration information.

Specifically, a broadcast channel (BCH) is mapped to the PBCH after undergoing CRC, rate matching and channel coding, CRC mask scrambling, and antenna mapping. Correspondingly, after receiving the PBCH, the terminal needs to obtain the BCH through demapping, descrambling, reverse CRC, and the like. After the descrambling, the terminal may obtain the CRC mask. In this embodiment, there is a preset correspondence between a CRC mask and configuration information. Optionally, the CRC mask may indicate whether a reference signal is carried in a subframe. Different CRC masks correspond to different reference signal sequences, different CRC masks correspond to different time-frequency resource locations of reference signals, and different CRC masks correspond to different ports of reference signals.

In another possible case, the terminal obtains the configuration information of the reference signal based on a correspondence between a physical cell identifier and configuration information.

Specifically, there are 504 physical cell identifiers (PCI) in an LTE system. The terminal searches for a primary synchronization signal (PSS) and a secondary synchronization signal (SSS), and combines the two signals to determine a specific physical cell identifier. Optionally, the physical cell identifier may correspondingly indicate whether a reference signal is carried in a subframe. When the physical cell identifier is a number identifier, modulo processing may be performed on the physical cell identifier based on a quantity of reference signal sequences, and different modulo results correspond to different reference signal sequences; or modulo processing may be performed on the physical cell identifier based on a quantity of location types of time-frequency resources, and different modulo results correspond to different time-frequency resource locations.

In this embodiment, the configuration information is determined based on the CRC mask or the physical cell identifier. There is no need to independently send information, existing information is unchanged, and no new information is added. Therefore, a process in which the terminal obtains the configuration information is simple and easy to implement.

Based on the foregoing embodiment, in an application scenario in which the base station sends downlink data to the terminal, the terminal may further send a configuration indication to the base station, so that the base station can generate indication information of a downlink reference signal. Implementations shown in FIG. 7 and FIG. 8 may be specifically included.

Figure 7:
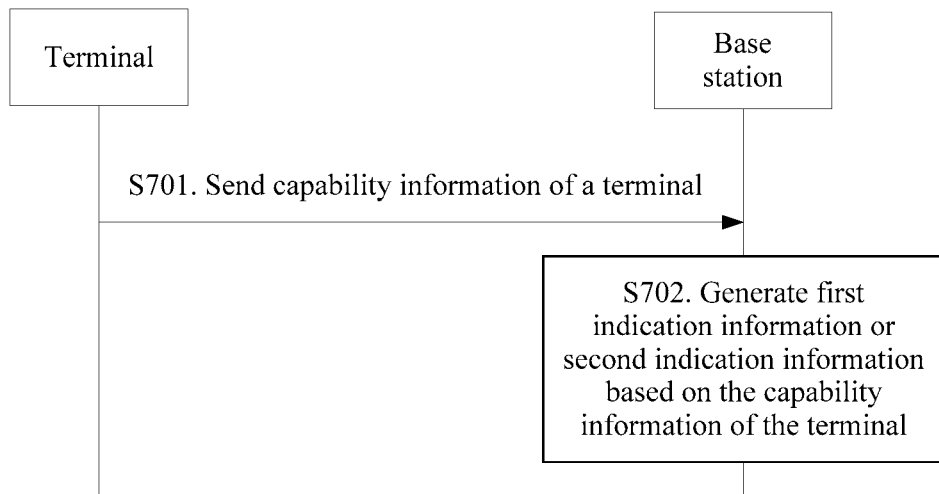
FIG. 7 is a signaling flowchart of Embodiment 3 of a data transmission method according to an embodiment of this application.

FIG. 7 is a signaling flowchart of Embodiment 3 of a data transmission method according to an embodiment of this application. The method includes:

S701. A terminal sends capability information of the terminal to a base station.

The capability information is used to indicate whether the terminal has a capability of canceling phase noise.

S702. The base station generates first indication information or second indication information based on the capability information of the terminal.

Specifically, the terminal may directly send the capability information to the base station; or the capability information may be carried in an RRC message sent by the terminal to the base station, or may be carried in another message. The capability information is specifically used to indicate whether the terminal has a capability of canceling phase noise.

After receiving the capability information, the base station generates configuration information based on the capability information, that is, whether the base station needs to insert a reference signal into a downlink resource unit.

When the capability information is used to indicate that the terminal does not have the capability of canceling phase noise, the base station generates the second indication information.

When the capability information is used to indicate that the terminal has the capability of canceling phase noise, the base station generates the first indication information.

In this embodiment, the terminal sends the capability information to the base station. The base station generates the first indication information or the second indication information based on the capability information. Therefore, not only overheads of a phase noise pilot are reduced, but also it is ensured that downlink data finally obtained by the terminal is not interfered by phase noise.

Figure 8:
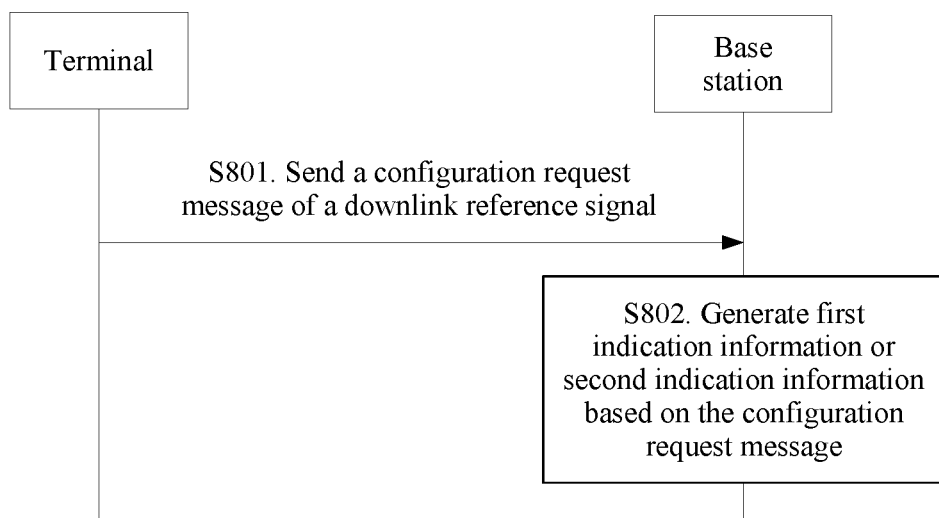
FIG. 8 is a signaling flowchart of Embodiment 4 of a data transmission method according to an embodiment of this application.

FIG. 8 is a signaling flowchart of Embodiment 4 of a data transmission method according to an embodiment of this application. The method includes:

S801. A terminal sends a configuration request message of a downlink reference signal to a base station.

The configuration request message is used to request the base station to stop sending the downlink reference signal, or is used to request the base station to send the downlink reference signal.

S802. The base station generates first indication information or second indication information based on the configuration request message.

Specifically, the terminal may send the configuration request message of the downlink reference signal to the base station based on a demodulation result of downlink data. Specifically, if there is relatively large phase noise interference in the demodulation result, the configuration request message is used to request the base station to send the downlink reference signal. If there is no phase noise interference in the demodulation result, the configuration request message is used to request the base station to stop sending the downlink reference signal.

After receiving the configuration request message of the downlink reference signal that is sent by the terminal, the base station generates the indication information based on the configuration request message. Specifically, if the configuration request message is used to request the base station to send the downlink reference signal, the base station generates the first indication information. If the configuration request message is used to request the base station not to send the downlink reference signal, the base station generates the second indication information.

In this embodiment, the terminal sends the configuration request message to the base station. The base station generates the indication information based on the configuration request message. Therefore, not only overheads of a phase noise pilot are reduced, but also it is ensured that downlink data finally obtained by the terminal is not interfered by phase noise. Based on the foregoing embodiment, reference signals provided in this embodiment may further be classified into a user-level reference signal and a cell-level reference signal, to be specific, a user-level phase noise pilot and a cell-level phase noise pilot. The user-level phase noise pilot is specific to one terminal and used by the terminal device to perform phase noise estimation. The cell-level phase noise pilot is specific to a plurality of terminals and used by terminals in a physical cell to perform phase noise estimation.

The cell-level phase noise pilot is carried in a downlink resource unit, and the user-level phase noise pilot may be carried in an uplink resource unit or a downlink resource unit. Both the cell-level phase noise pilot and the user-level phase noise pilot may be used. For example, the cell-level phase noise pilot is used in a downlink, and the user-level phase noise pilot is used in an uplink.

Further, for downlink data transmission, only one of the cell-level phase noise pilot and the user-level phase noise pilot is used. Specifically, when a quantity of terminals in a preset range is less than a first preset quantity, the user-level phase noise pilot is used; or when a quantity of terminals in a preset range is greater than a second preset quantity, the cell-level phase noise pilot is used. The first preset quantity may be equal to the second preset quantity, or the first preset quantity may be less than the second preset quantity. The preset range may be a range covered by a physical cell.

In this embodiment, a system may use different phase noise pilots in different scenarios, to achieve a balance between overheads and performance.

The foregoing describes the solutions provided in the embodiments of this application mainly from a perspective of interaction between the base station and the terminal. It may be understood that, to implement the foregoing functions, the base station and the terminal include a hardware structure and/or a software module for performing corresponding functions. With reference to units and algorithm steps in the examples described in the disclosed embodiments of this application, the embodiments of this application may be implemented in a form of hardware or a combination of hardware and computer software. Whether a function is performed by hardware or by computer software driving hardware depends on particular applications and design constraint conditions of the technical solutions. Persons skilled in the art may use different methods to implement the described functions for each particular application, but it should not be considered that the implementation goes beyond the scope of the technical solutions in the embodiments of this application.

In the embodiments of this application, the base station and the terminal may be divided into functional units based on the foregoing method examples. For example, the functional units may be obtained through division based on corresponding functions, or two or more functions may be integrated into one processing unit. The integrated unit may be implemented in a form of hardware, or may be implemented in a form of a software functional unit. It should be noted that, in the embodiments of this application, unit division is an example, and is merely a logical function division. In actual implementation, there may be another division manner.

Figure 9:
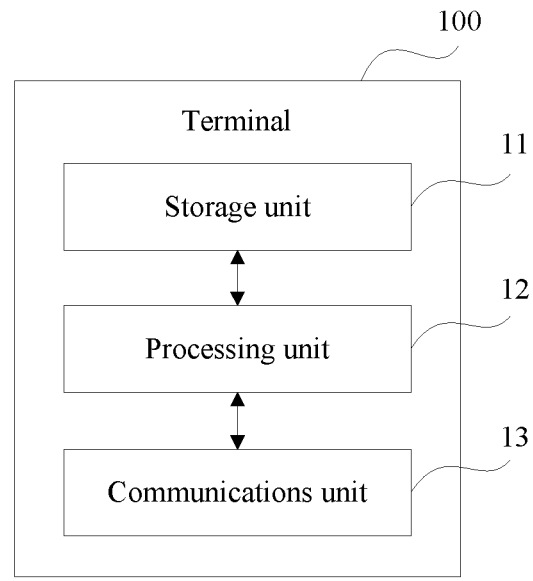
FIG. 9 shows a possible schematic structural diagram of a related terminal according to an embodiment of this application.

When an integrated unit is used, FIG. 9 shows a possible schematic structural diagram of a related terminal according to the foregoing embodiments. A terminal 100 includes a processing unit 12 and a communications unit 13. The processing unit 12 is configured to control and manage an action of the terminal. For example, the processing unit 12 is configured to support the terminal in performing the processes S301 and S302 in FIG. 3, the processes S403 and S404 in FIG. 4, the processes S502 and S503 in FIG. 5, the process S602 in FIG. 6, the process S701 in FIG. 7, and the process S801 in FIG. 8 and/or another process of a technology described in this specification. The communications unit 13 is configured to support communication between the terminal and a base station. The terminal may further include a storage unit 11, configured to store program code and data of the terminal.

The processing unit 12 may be a processor or a controller, for example, a central processing unit (CPU), a general-purpose processor, a digital signal processor (DSP), an application-specific integrated circuit (ASIC), a field programmable gate array (FPGA) or another programmable logic component, a transistor logic component, a hardware component, or any combination thereof. The processing unit 12 may implement or perform various example logical blocks, modules, and circuits that are described with reference to the disclosed content of this application. The processor may also be a combination for implementing computing functions, for example, a combination of one or more microprocessors and a combination of a DSP and a microprocessor. The communications unit 13 is a transceiver, a transceiver circuit, or the like. The storage unit 11 may be a memory.

Figure 10:
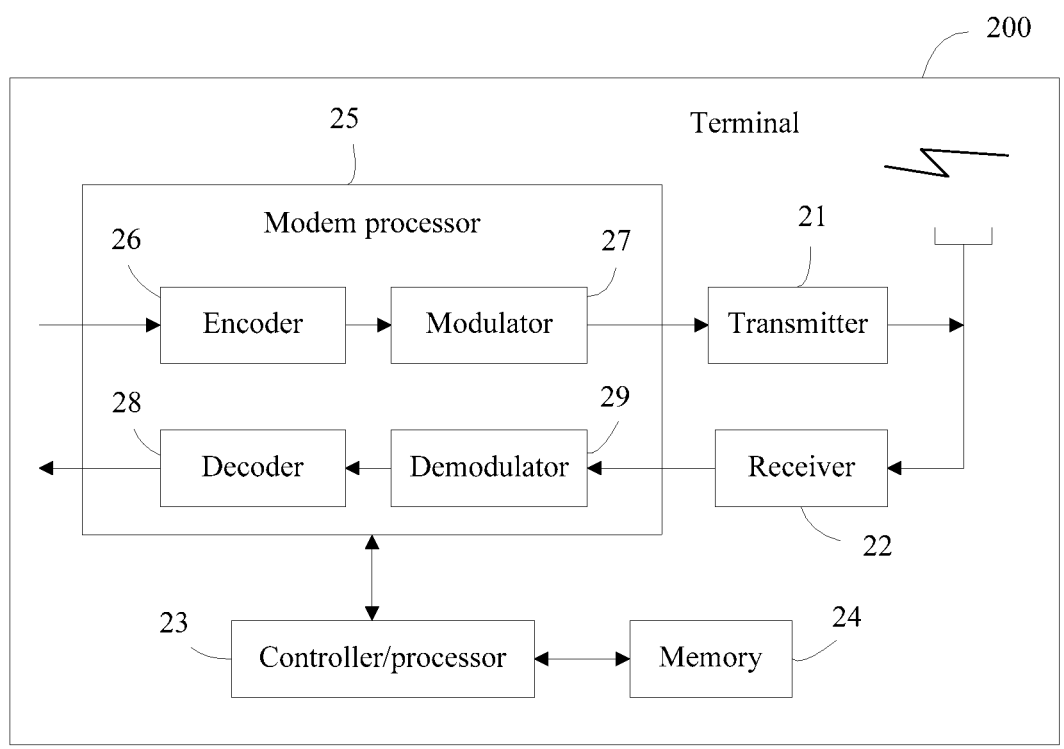
FIG. 10 shows another possible schematic structural diagram of a related terminal according to an embodiment of this application.

When the processing unit 12 is a processor, the communications unit 13 includes a transmitter and/or a receiver, and the storage unit 11 is a memory, the related terminal in this embodiment of this application may be the terminal shown in FIG. 10.

FIG. 10 shows a simplified schematic diagram of a possible design structure of a related terminal according to an embodiment of this application. A terminal 200 includes a transmitter 21, a receiver 22, and a processor 23. The processor 23 may also be a controller, and is represented as a "controller/processor 23" in FIG. 10. Optionally, the terminal 200 may further include a modem processor 25. The modem processor 25 may include an encoder 26, a modulator 27, a decoder 28, and a demodulator 29.

In an example, the transmitter 21 adjusts (for example, performs analog conversion, filtering, amplification, and up-conversion) output sampling and generates an uplink signal. The uplink signal is transmitted to the base station in the foregoing embodiments through an antenna. In a downlink, the antenna receives a downlink signal transmitted by the base station in the foregoing embodiments. The receiver 22 adjusts (for example, performs filtering, amplification, down-conversion, and digitization) a signal received from the antenna and provides input sampling. In the modem processor 25, the encoder 26 receives service data and a signaling message that are to be sent in an uplink, and processes the service data and the signaling message (for example, performs formatting, encoding, and interleaving). The modulator 27 further processes (for example, performs symbol mapping and modulation) encoded service data and an encoded signaling message, and provides output sampling. The demodulator 29 processes (for example, performs demodulation) the input sampling, and provides symbol estimation. The decoder 28 processes (for example, performs de-interleaving and decoding) the symbol estimation, and provides decoded data and a decoded signaling message that are to be sent to the terminal 200. The encoder 26, the modulator 27, the demodulator 29, and the decoder 28 may be implemented by the combined modem processor 25. The units perform processing based on a radio access technology (for example, access technologies of LTE and another evolved system) used in a radio access network. It should be noted that, when the terminal 200 does not include the modem processor 25, the foregoing functions of the modem processor 25 may also be completed by the processor 23.

The processor 23 controls and manages an action of the terminal 200, and is configured to execute a processing process performed by the terminal 200 in the foregoing embodiments of this application. For example, the processor 23 is further configured to perform the processes S301 and S302 in FIG. 3, the processes S403 and S404 in FIG. 4, the processes S502 and S503 in FIG. 5, the process S602 in FIG. 6, the process S701 in FIG. 7, and the process S801 in FIG. 8 and/or another process of the technical solutions described in this application.

Further, the terminal 200 may further include a memory 24. The memory 24 is configured to store program code and data of the terminal 200.

Figure 11:
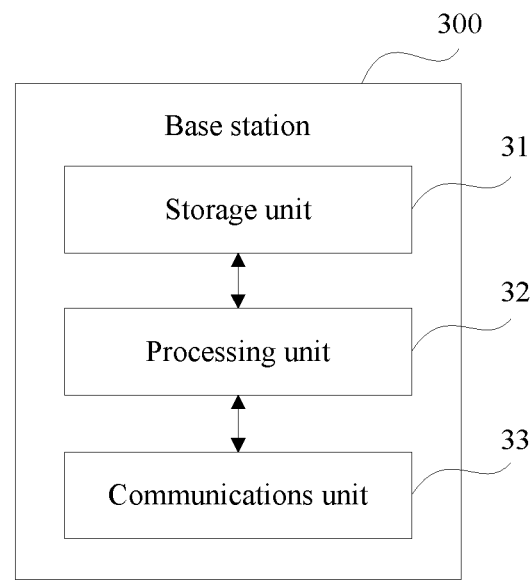
FIG. 11 shows a possible schematic structural diagram of a related base station according to an embodiment of this application.

When an integrated unit is used, FIG. 11 shows a possible schematic structural diagram of a related base station according to the foregoing embodiments. A base station 300 includes a processing unit 32 and a communications unit 33. The processing unit 32 is configured to control and manage an action of the base station. For example, the processing unit 32 is configured to support the base station in performing the processes S401 to S403 in FIG. 4, the processes S501, S503, and S504 in FIG. 5, the process S601 in FIG. 6, the process S702 in FIG. 7, and the process S802 in FIG. 8 and/or another process of a technology described in this specification. The communications unit 33 is configured to support communication between the base station and a terminal. In addition, the communications unit 33 may further support communication between the base station and another network entity, for example, a mobility management entity (MME) and a serving gateway (SGW). The base station may further include a storage unit 31, configured to store program code and data of the base station.

The processing unit 32 may be a processor or a controller, for example, a central processing unit (CPU), a general-purpose processor, a digital signal processor (DSP), an application-specific integrated circuit (ASIC), a field programmable gate array (FPGA) or another programmable logic component, a transistor logic component, a hardware component, or any combination thereof. The processing unit 32 may implement or perform various example logical blocks, modules, and circuits that are described with reference to the disclosed content of this application. The processor may also be a combination for implementing computing functions, for example, a combination of one or more microprocessors and a combination of a DSP and a microprocessor. The communications unit 33 may include a transceiver, a transceiver circuit, a communications interface, and the like. The storage unit 31 may be a memory.

Figure 12:
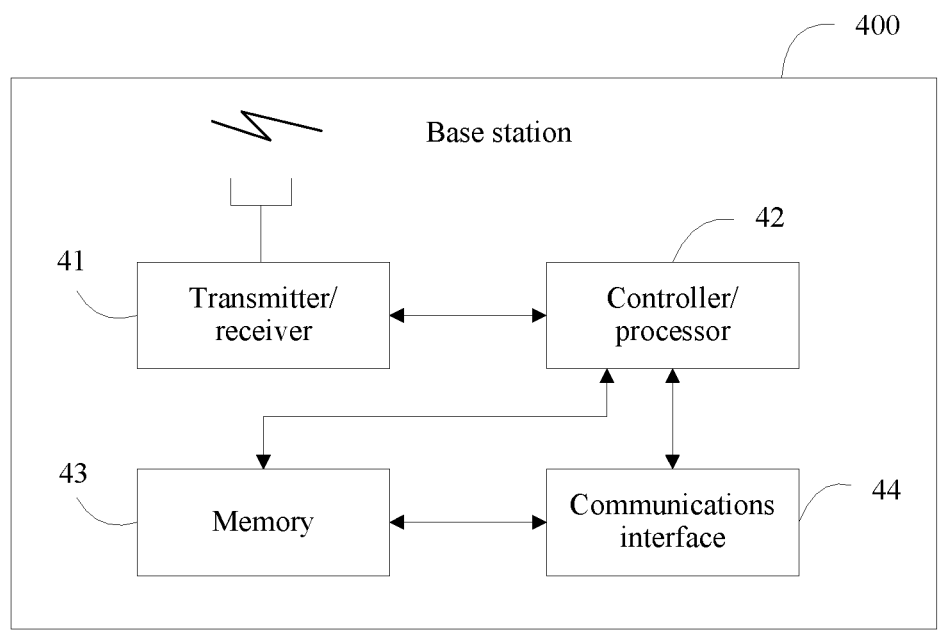
FIG. 12 shows another possible schematic structural diagram of a related base station according to an embodiment of this application.

When the processing unit 32 is a processor, the communications unit 33 includes a transmitter and/or a receiver, and the storage unit 31 is a memory, the related base station in this embodiment of this application may be a base station shown in FIG. 12. The transmitter and/or the receiver may be represented as a "transmitter/receiver".

FIG. 12 shows another possible schematic structural diagram of a related base station according to an embodiment of this application.

A base station 400 includes a transmitter/receiver 41 and a processor 42. The processor 42 may also be a controller, and is represented as a "controller/processor 42" in FIG. 12. The transmitter/receiver 41 is configured to support the base station in sending and receiving information to/from the terminal in the foregoing embodiments, and support radio communication between the terminal and another terminal. The processor 42 performs various functions of communicating with the terminal. In an uplink, an uplink signal from the terminal is received via an antenna, and is demodulated by the receiver 41 (for example, a high-frequency signal is demodulated to obtain a baseband signal). Further, the processor 42 performs processing to restore service data and signaling information sent by the terminal. In a downlink, service data and a signaling message are processed by the processor 42, and are modulated by the transmitter 41 (for example, a baseband signal is modulated to obtain a high-frequency signal) to generate a downlink signal. The downlink signal is transmitted to the terminal via the antenna. It should be noted that the foregoing demodulation or modulation function may also be completed by the processor 42. For example, the processor 42 is further configured to perform the processes S401 to S403 in FIG. 4, the processes S501, S503, and S504 in FIG. 5, the process S601 in FIG. 6, the process S702 in FIG. 7, and the process S802 in FIG. 8 and/or another process of the technical solution described in this application.

Further, the base station 400 may further include a memory 43. The memory 43 is configured to store program code and data of the base station 40. In addition, the base station may further include a communications interface 44. The communications interface 44 is configured to support communication between the base station and another network entity (for example, a network device in a core network). For example, in an LTE system, the communications interface 44 may be an S1-U interface, and is configured to support communication between the base station and an SGW; or the communications interface 44 may be an S1-MME interface, and is configured to support communication between the base station and an MME.

It may be understood that FIG. 12 shows only a simplified design of the base station 400. In actual application, the base station 400 may include any quantity of transmitters, receivers, processors, controllers, memories, communications interfaces, and the like. All base stations that can implement this embodiment of this application fall within the protection scope of this embodiment of this application.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a base station or a terminal. Certainly, the processor and the storage medium may exist in a base station or a terminal as discrete components.

Persons skilled in the art should be aware that in the foregoing one or more examples, functions described in the embodiments of this application may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method comprising:
    obtaining, by a terminal device, downlink control information (DCI) comprising information about a modulation order and a quantity of scheduled resource blocks; and
    performing, by the terminal device, data communications in one or more of the scheduled resource blocks according to the modulation order,
        wherein information carried in the one or more of the scheduled resource blocks does not include any phase noise reference signal based on the modulation order being less than a preset modulation order,
        wherein the information carried in the one or more of the scheduled resource blocks also does not include any phase noise reference signal based on the quantity of the scheduled blocks being less than a preset quantity, and
        wherein the information carried in the one or more of the scheduled resource blocks includes at least one phase noise reference signal based on the modulation order being greater than or equal to the preset modulation order and the quantity of the scheduled resource blocks being greater than or equal to the preset quantity.

2. The method according to claim 1, wherein based on the reference signal being a downlink reference signal, performing the data communications comprises receiving the information carried in the one or more of the scheduled resource blocks; and
    based on the reference signal being an uplink reference signal, performing the data communications comprises transmitting the information carried in the one or more of the scheduled resource blocks.

3. The method according to claim 1, wherein the reference signal is used in a high frequency scenario.

4. A method comprising:
    sending, by an access network device, downlink control information (DCI) comprising information about a modulation order and a quantity of scheduled resource blocks; and
    performing, by the access network device, data communications in one or more of the scheduled resource blocks according to the modulation order,
        wherein information carried in the one or more of the scheduled resource blocks does not include any phase noise reference signal based on a modulation order being less than a preset modulation order,
        wherein the information carried in the one or more of the scheduled resource blocks also does not include any phase noise reference signal based on the quantity of the scheduled blocks being less than a preset quantity, and wherein the information carried in the one or more of the scheduled resource blocks includes at least one phase noise reference signal based on the modulation order being greater than or equal to the preset modulation order and the quantity of the scheduled resource blocks being greater than or equal to a preset quantity.

5. The method according to claim 4, wherein based on the reference signal being a downlink reference signal, performing the data communications comprises transmitting the information carried in the one or more of the scheduled resource blocks; and based on the reference signal being an uplink reference signal, performing the data communications comprises receiving the information carried in the one or more of the scheduled resource blocks.

6. The method according to claim 4, wherein the reference signal is used in a high frequency scenario.

7. An apparatus comprising: at least one processor and a transceiver, wherein the at least one processor is configured to:

obtain, through the transceiver, downlink control information (DCI) comprising information about a modulation order and a quantity of scheduled resource blocks; and perform, through the transceiver, data communications in one or more of the scheduled resource blocks according to the modulation order, wherein information carried in the one or more of the scheduled resource blocks does not include any phase noise reference signal based on the modulation order being less than a preset modulation order, wherein the information carried in the one or more of the scheduled resource blocks also does not include any phase noise reference signal based on the quantity of the scheduled blocks being less than a preset quantity, and wherein the information carried in the one or more of the scheduled resource blocks includes at least one phase noise reference signal, based on the modulation order being greater than or equal to the preset modulation order and the quantity of the scheduled resource blocks being greater than or equal to a preset quantity.

8. The apparatus according to claim 7, wherein based on the reference signal being a downlink reference signal during the data communications, the transceiver is configured to receive the information carried in the one or more of the scheduled resource blocks; and based on the reference signal being an uplink reference signal during the data communications, the transceiver is configured to transmit the information carried in the one or more of the scheduled resource blocks.

9. The apparatus according to claim 7, wherein the reference signal is used in a high frequency scenario.

10. An apparatus comprising: at least one processor and a transceiver, wherein the at least one processor is configured to:

send, through the transceiver, downlink control information (DCI) comprising information about a modulation order and a quantity of scheduled resource blocks; and perform, through the transceiver, data communications in one or more of the scheduled resource blocks according to the modulation order, wherein information carried in the one or more of the scheduled resource blocks does not include any phase noise reference signal based on the modulation order being less than a preset modulation order, wherein the information carried in the one or more of the scheduled resource blocks also does not include any phase noise reference signal based on the quantity of the scheduled blocks being less than a preset quantity, and wherein the information carried in the one or more of the scheduled resource blocks includes at least one phase noise reference signal, based on the modulation order being greater than or equal to the preset modulation order and the quantity of the scheduled resource blocks being greater than or equal to a preset quantity.

11. The apparatus according to claim 10, wherein based on the reference signal being a downlink reference signal during the data communications, the transceiver is configured to cooperate with the processor to transmit the information carried in the one or more of the scheduled resource blocks; and based on the reference signal being an uplink reference signal during the data communications, the transceiver is configured to cooperate with the processor to receive the information carried in the one or more of the scheduled resource blocks.

12. The apparatus according to claim 10, wherein the reference signal is used in a high frequency scenario.

13. A method comprising:

sending, by an access network device, downlink control information (DCI) comprising information about a modulation order and a quantity of scheduled resource blocks;

obtaining, by a terminal device, the DCI; and performing data communications between the access network device and the terminal device in one or more of the scheduled resource blocks according to the modulation order, wherein information carried in the one or more of the scheduled resource blocks does not include any phase noise reference signal based on the modulation order being less than a preset modulation order, wherein the information carried in the one or more of the scheduled resource blocks also does not include any phase noise reference signal based on the quantity of the scheduled blocks being less than a preset quantity, and wherein the information carried in the one or more of the scheduled resource blocks includes at least one phase noise reference signal, based on the modulation order being greater than or equal to the preset modulation order and the quantity of the scheduled resource blocks being greater than or equal to the preset quantity.

14. The method according to claim 13, wherein each of the preset modulation order and the preset quantity is prestored in the terminal device and the access network or obtained by the terminal device from the access network device.

15. The method according to claim 13, wherein based on the reference signal being a downlink reference signal, performing the data communications comprises:

transmitting, by the access network device, the information carried in the one or more of the scheduled resource blocks; and receiving, by the terminal device, the information; and based on the reference signal being an uplink reference signal, performing the data communications comprises:
transmitting, by the terminal device, the information carried in the one or more of the scheduled resource blocks; and
receiving, by the access network device, the information.

16. The method according to claim 13, wherein the reference signal is used in a high frequency scenario.

* * * * *